US009817695B2

(12) United States Patent
Clark

(10) Patent No.: US 9,817,695 B2
(45) Date of Patent: Nov. 14, 2017

(54) METHOD AND SYSTEM FOR MIGRATING PROCESSES BETWEEN VIRTUAL MACHINES

(75) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/416,415

(22) Filed: Apr. 1, 2009

(65) Prior Publication Data

US 2010/0257269 A1 Oct. 7, 2010

(51) Int. Cl.

*G06F 15/16* (2006.01)
*G06F 9/48* (2006.01)
*G06F 9/50* (2006.01)
*G06F 9/455* (2006.01)

(52) U.S. Cl.

CPC ........ *G06F 9/4856* (2013.01); *G06F 9/45558* (2013.01); *G06F 9/5083* (2013.01); *G06F 2009/4557* (2013.01)

(58) Field of Classification Search

CPC ........................................................ G06F 15/16
USPC ...................................... 709/226; 718/1, 105
See application file for complete search history.

(56) References Cited

U.S. PATENT DOCUMENTS 6,393,459 B1 * 5/2002 Lurndal ........................ 709/203
2002/0112076 A1 * 8/2002 Rueda ..................... H04L 12/14 709/245
2003/0187915 A1 * 10/2003 Sun et al. ..................... 709/201
2004/0133634 A1 * 7/2004 Luke et al. ................... 709/203
2005/0005006 A1 * 1/2005 Chauffour ........... H04L 67/1027 709/223
2005/0160424 A1 * 7/2005 Broussard et al. ............... 718/1
2005/0268298 A1 * 12/2005 Hunt et al. ........................ 718/1
2006/0195715 A1 * 8/2006 Herington ......................... 714/4
2006/0230407 A1 * 10/2006 Rosu ..................... G06F 9/5088 718/105
2007/0079307 A1 * 4/2007 Dhawan ............ H04L 29/12584 718/1
2007/0186025 A1 * 8/2007 Boyd et al. ................... 710/305
2009/0150883 A1 * 6/2009 Tripathi et al. ................... 718/1
2009/0228629 A1 * 9/2009 Gebhart et al. ................... 711/6
2010/0162252 A1 * 6/2010 Bacher .................. G06F 9/4856 718/102

OTHER PUBLICATIONS

David R. Cheriton “The V Distributed System”, Communications of the ACM, Mar. 1988 vol. 31 No. 3.*
Application No. 201010144050.9, Chinese Office Action, (dated Nov. 19, 2012).

* cited by examiner

*Primary Examiner* — Michael Y Won
*Assistant Examiner* — Sibte Bukhari

(57) ABSTRACT

One or more processes are offloaded from one virtual machine running on one host computer to another virtual machine running on another host computer so that load balancing can be performed on a per process level and physical servers supporting the virtual machines can be more optimally utilized. Migrating one or more processes from a virtual machine running on a first host computer to a second host computer includes replicating the virtual machine on the second host computer, terminating the migrated processes from the virtual machine running on the first host computer, and terminating all user-level processes running on the replicated virtual machine other than the migrated processes.

21 Claims, 9 Drawing Sheets

HOST COMPUTER 100
118
VM 120₁
Applications 136
Guest Operating System 132
120₂ VM
120_N VM
Virtual Hardware Platform 122₁
124 CPU
126 RAM
130 Hard Drive
128 NIC
122₂
122_N
138_A Virtual Machine Monitor
138₂
138_N
114 Device Driver Layer
NIC Driver 115
Virtual Bridge 116
Hypervisor 112
HW PLATFORM 102
CPU 104
RAM 106
NIC 108
Hard Drive 110

| IP Address | Port | MAC Address |
|---|---|---|
| 192.168.1.10 | 8756 | MAC Address 229 |
| | 8618 | MAC Address 229 |
| | 2345 | MAC Address 228 |
| | 7856 | MAC Address 228 |
| ... | | |

METHOD AND SYSTEM FOR MIGRATING PROCESSES BETWEEN VIRTUAL MACHINES

BACKGROUND OF THE INVENTION

Virtualization technologies known as server based computing (SBC) and virtual desktop infrastructure (VDI) enable organizations to replace traditional personal computers (PCs) with instances of desktops that are hosted on virtual machines running on servers in a data center. A thin client installed on a user's terminal remotely connects to operating remote sessions that present a graphical portion of an application or desktop to the user on the terminal. Typically SBC systems are designed to host multiple users per operating system and VDI systems are designed to host one user per session. VDI uses multiple virtual machines, each simultaneously running an operating system, to host multiple running operating systems, thereby allowing multiple users to share a single physical server machine. Both types of systems are designed to target a large number of users where multiple servers are required. Both types of systems utilize a "connection broker" that dispatches a new application or login request to available servers to help with load balancing.

One advantage of VDI over SBC is an ability to migrate virtual desktops running on virtual machines across servers. When the workload on any one server becomes too high, virtual machines that are running virtual desktops can be migrated to other servers to distribute the workload. Such migration can be carried out, for example, using VMware VMotion, which is available from VMware, Inc. of Palo Alto, Calif. However, migration of entire virtual machines from one server to another server cannot alleviate excessive workloads that occur within a single virtual machine. Current migration techniques do not adequately resolve the increased workload within a single operating system where multiple processes are generating the load because any other server to which the virtual machine is migrated would also have to bear the same computational workload. As a way to protect against these types of situations, some SBC providers recommend maintaining a maximum workload of only 20% usage, leaving the 80% as a safety margin for usage spikes.

SUMMARY OF THE INVENTION

One or more embodiments of the present invention provide a method and system to migrate individual user-level processes running within a particular virtual machine on one server to another server. The migrated user-level processes are placed in a virtual machine on the other server that replicates the original virtual machine such that the user-level processes continue to run as if they were still running in the original virtual machine, for example, maintaining the same network connections such that user terminals that are interacting with the migrated processes do not realize that they are interacting with a different server. Such "per process" migration provides the capability to load balance servers at a process level such that significant improvements in hardware resource utilization can now occur in a manner that was not possible with prior techniques of migrating entire virtual machines.

A method of offloading one or more user-level processes running on a first virtual machine to a second virtual machine, according to an embodiment of the invention, includes the steps of identifying one or more user-level processes running on the first virtual machine to be offloaded, replicating the first virtual machine to create the second virtual machine, and terminating the user-level processes running on the first virtual machine that were identified for offloading and terminating all of the user-level processes running on the second virtual machine other than ones that were identified for offloading.

A method of offloading one or more processes running on a first virtual machine instantiated on a first host computer to a second host computer, according to an embodiment of the invention, includes the steps of identifying one or more processes running on the first virtual machine to be offloaded, replicating the first virtual machine on a second host computer to create a second virtual machine, and terminating some but not all of the processes running on the first virtual machine and terminating some but not all of the processes running on the second virtual machine.

A computer system, according to an embodiment of the invention, includes a first host computer having a plurality of virtual machines running thereon, a second host computer having a plurality of virtual machines running thereon, and a router configured to direct a data packet to a first virtual machine on the first host computer and a second virtual machine on the second host computer based on a destination IP address and a destination port specified in the data packet, wherein the first virtual machine and the second virtual machine share the same IP address.

DETAILED DESCRIPTION

Figure 1:
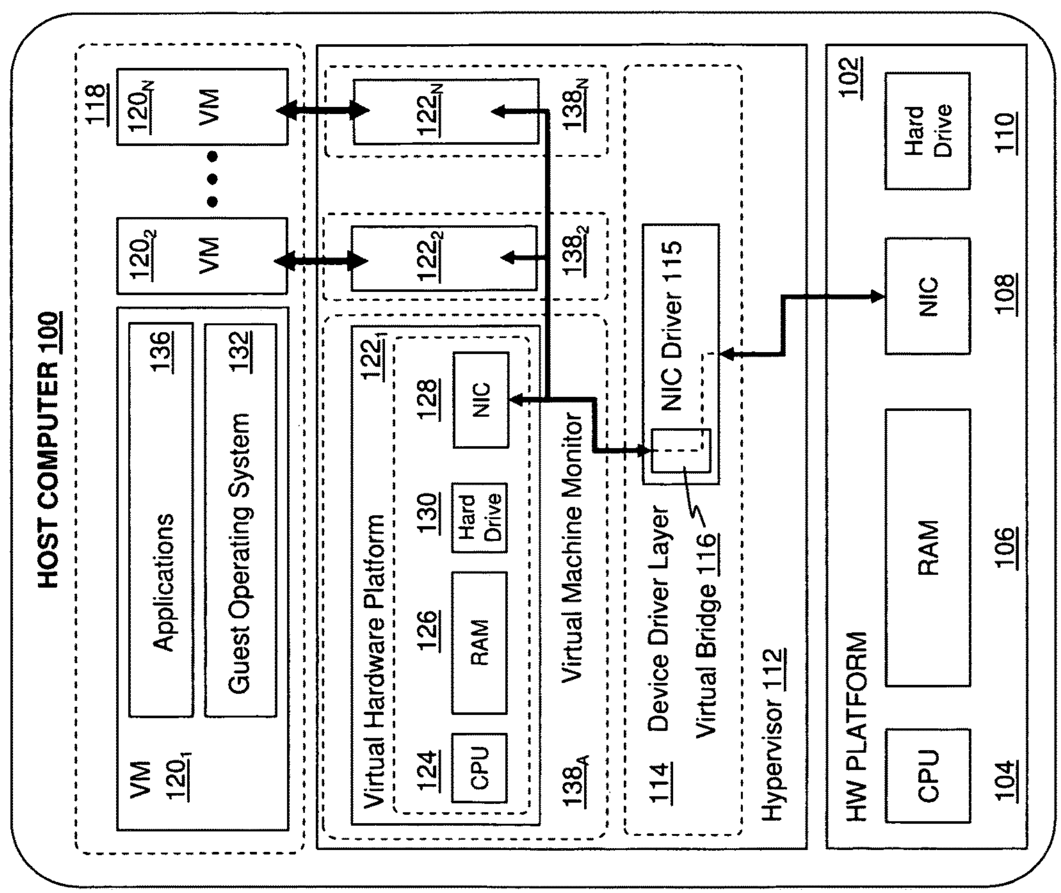
FIG. 1 depicts a block diagram of virtual machines that are configured on a host computer.

FIG. 1 depicts a block diagram of virtual machines $\mathbf{120}_1$, $\mathbf{120}_2$ . . . $\mathbf{120}_N$ that are configured on a host computer 100. Host computer 100 may be constructed on a desktop, laptop or server grade hardware platform 102 such as an x86 architecture platform. Such a hardware platform may include CPU 104, RAM 106, network card 108 (also referred to herein as a network interface controller or NIC), hard drive 110 and other I/O devices such as a mouse and keyboard (not shown in FIG. 1). A virtualization software layer, also referred to hereinafter as hypervisor 112, is installed on top of hardware platform 102. The virtualization software layer supports virtual machine execution space 118 within which multiple virtual machines (VMs $\mathbf{120}_1$-$\mathbf{120}_N$) may be concurrently instantiated and executed. Hypervisor

112 includes device driver layer 114, and maps physical resources of hardware platform 102 (e.g., CPU 104, RAM 106, NIC 108, hard drive 110, a mouse, a keyboard, etc.) to "virtual" resources of each of VMs $\mathbf{120}_1$-$\mathbf{120}_N$ such that each of VMs $\mathbf{120}_1$-$\mathbf{120}_N$ has its own virtual hardware platform (i.e., a corresponding one of virtual hardware platforms $\mathbf{122}_1$-$\mathbf{122}_N$), each virtual hardware platform having its own emulated hardware (such as CPU 124, RAM 126, NIC 128, hard drive 130 and other emulated I/O devices in VM $\mathbf{120}_1$). Device driver layer 114 includes, for example, a NIC driver 115 that interacts with NIC 108 to receive and transmit data from, for example, a local area network (LAN) connected to host computer 100. NIC driver 115 also includes a virtual bridge 116 that simulates the broadcasting of data packets in a physical network received from one NIC (i.e., NIC 108) to other NICs (i.e., the virtual NICS of VMs $\mathbf{120}_1$-$\mathbf{120}_N$). Each virtual NIC for each VM $\mathbf{120}_1$-$\mathbf{120}_N$, such as NIC 128 for VM $\mathbf{120}_1$, is assigned a unique virtual Media Access Control (MAC) address that enables virtual bridge 116 to simulate the forwarding of incoming data packets from NIC 108. In one embodiment, NIC 108 is an Ethernet adapter that is configured in "promiscuous mode" such that all Ethernet packets that it receives (rather than just Ethernet packets addressed to its own physical MAC address) are passed to virtual bridge 116, which, in turn, is able to further forward the Ethernet packets to VMs $\mathbf{120}_1$-$\mathbf{120}_N$. This configuration enables an Ethernet packet that has a virtual MAC address as its destination address to properly reach the VM in host computer 100 with a virtual NIC that corresponds to such virtual MAC address.

Virtual hardware platform $\mathbf{122}_1$ may function as an equivalent of a standard x86 hardware architecture such that any x86 supported desktop operating system, e.g., Microsoft Windows®, Linux®, Solaris® x86, NetWare, FreeBSD, etc., may be installed as guest operating system (OS) 132 in order to execute applications 136 for an instantiated VM, e.g., VM $\mathbf{120}_1$. Virtual hardware platforms $\mathbf{122}_1$-$\mathbf{122}_N$ may be considered to be part of virtual machine monitors (VMM) $\mathbf{138}_A$-$\mathbf{138}_N$ which implement the virtual system support needed to coordinate operations between hypervisor 112 and corresponding VMs $\mathbf{120}_1$-$\mathbf{120}_N$. Those with ordinary skill in the art will recognize that the various terms, layers and categorizations used to describe the virtualization components in FIG. 1 may be referred to differently without departing from their functionality or the spirit or scope of the invention. For example, virtual hardware platforms $\mathbf{122}_1$-$\mathbf{122}_N$ may also be considered to be separate from VMMs $\mathbf{138}_A$-$\mathbf{138}_N$, and VMMs $\mathbf{138}_A$-$\mathbf{138}_N$ may be considered to be separate from hypervisor 112. One example of hypervisor 112 that may be used in an embodiment of the invention is included as a component in VMware's ESX™ product, which is commercially available from VMware, Inc.

Figure 2A:
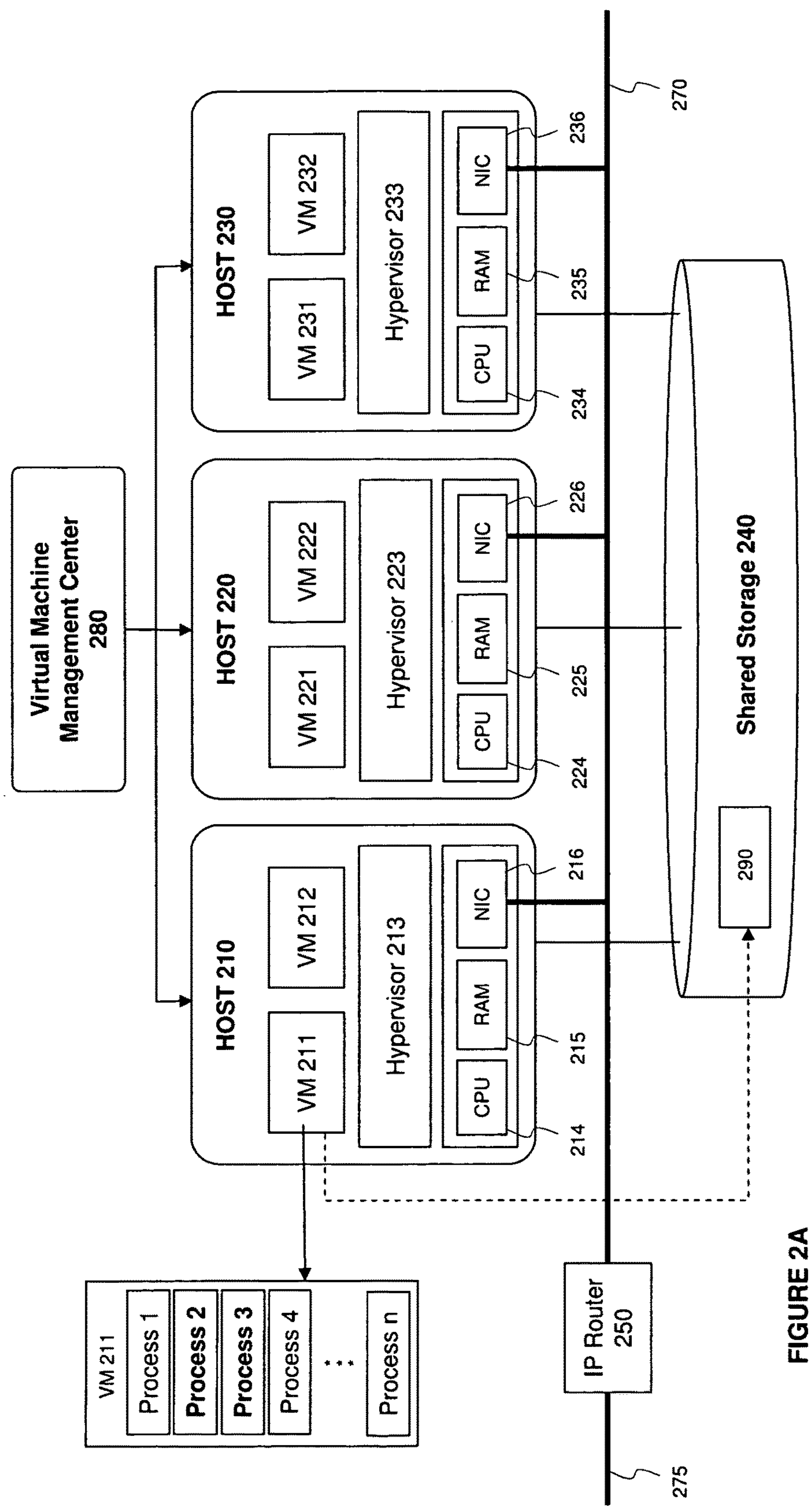
FIGS. 2A, 2B and 2C depict a virtual infrastructure in which one or more embodiments of the present invention may be practiced, and illustrate schematically how processes are migrated between virtual machines.
Figure 2B:
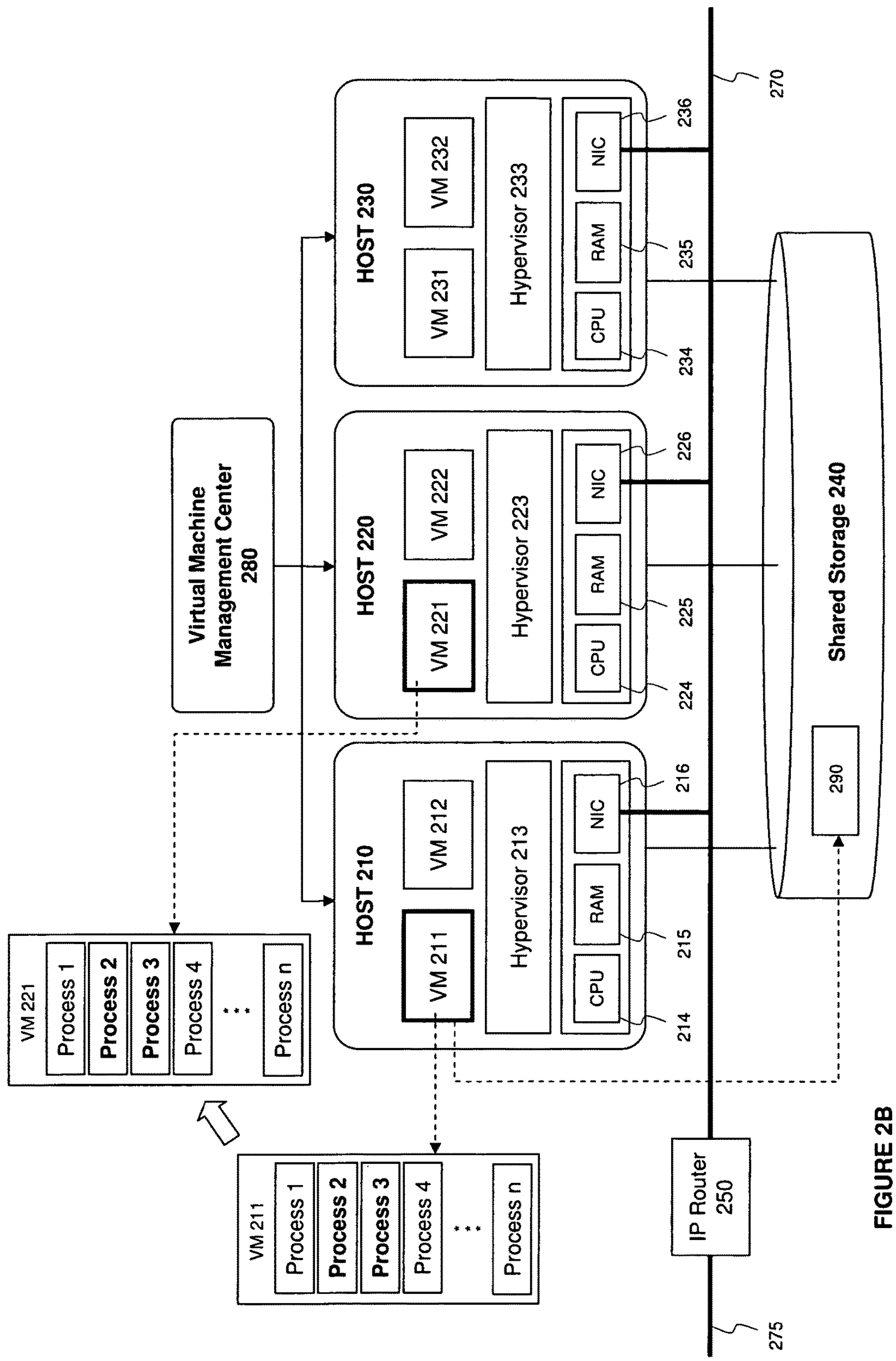
Figure 2C:
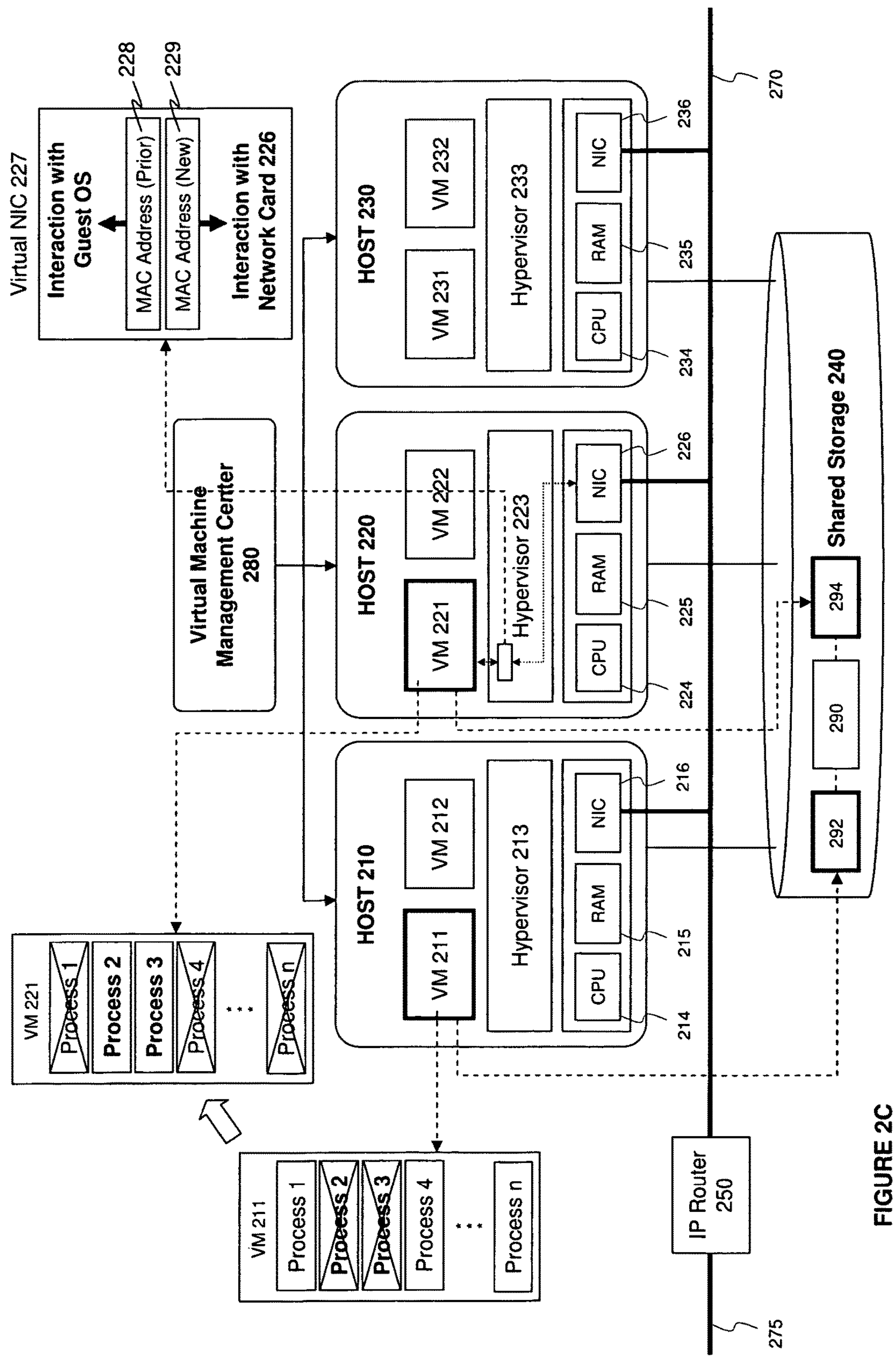

FIGS. 2A, 2B and 2C depict a virtual infrastructure in which one or more embodiments of the present invention may be practiced, and illustrate schematically how processes are migrated between VMs. The virtual desktop infrastructure includes a cluster of host computers (e.g., host 210, host 220, host 230) that are networked to a shared storage 240. Host 210 and its hardware resources (for example, CPU 214, RAM 215, and NIC 216) support VMs 211 and 212 through hypervisor 213. Host 220 and its hardware resources (for example, CPU 224, RAM 225, and NIC 226) support VMs 221 and 222 through hypervisor 223. Host 230 and its hardware resources (for example, CPU 234, RAM 235, and NIC 236) support VMs 231 and 232 through hypervisor 233. For simplicity, only two VMs are illustrated per host computer. In practice, a single host computer may support any number of VMs. Similarly, for exemplary purposes, VM 211 accesses a disk image 290 (corresponding to physical resources allocated for the virtual hard drive of VM 211) stored in shared storage 240. Other VMs have similar disk images corresponding to their virtual hard drives in shared storage 240. Virtual machine management center 280 is utilized by an IT function of an enterprise to create physical clusters and manage the provision and migration of VMs in such host computer clusters. In one embodiment, virtual machine management center 280 is able to track and query, for load balancing purposes, VMs on the host computers to determine the amount of hardware resources (CPU utilization, RAM memory, etc.) utilized by particular processes running in the VMs. Virtual machine management center 280 may be run on a separate computer system networked to the other computer systems in a cluster, as in FIGS. 2A-2C, or it may be run inside a VM on any particular host computer. One example of a virtual machine management center is VMware's VirtualCenter.

Each host computer of FIG. 2A has a connection to an Ethernet network 270 through its respective NIC. The host computer is identifiable in the Ethernet network through its corresponding MAC address and each VM running on each host computer is also identifiable in the Ethernet network 270 through the corresponding virtual MAC address of its virtual NIC. An IP router 250 receives IP packets from external network 275 and routes them to the correct destination through Ethernet network 270. For example, when IP router 250 receives an IP packet from external network 275 that is destined for VM 211, it extracts a destination IP address (i.e., the IP address of VM 211) from the IP packet and determines a corresponding MAC address for the destination IP address by transmitting an Address Resolution Protocol (ARP) request onto Ethernet network 270 that contains the destination IP address (or consults its ARP cache for the corresponding MAC address). When the virtual NIC of VM 211 receives the ARP request (via forwarding of the ARP request from physical NIC 216 in "promiscuous mode") of host 210 through the virtual bridge in hypervisor 213), it responds with its virtual MAC address. Upon receipt of the virtual MAC address of VM 211, IP router 250 encapsulates the IP packet into an Ethernet packet that specifies the virtual MAC address of VM 211 as its destination MAC address and transmits the Ethernet packet onto Ethernet network 270. When NIC 216 of host 210 receives the Ethernet packet, it forwards the Ethernet packet to the virtual bridge in hypervisor 213, which forwards the Ethernet packet to VM 211.

FIG. 2A schematically illustrates user-level processes, which are processes launched by an operating system on behalf of an application or user (e.g., Process 1, Process 2, Process 3, Process 4, . . . , Process n), that are running inside VM 211. Each process, for example, may relate to a particular application currently running in the guest OS of VM 211. Two of the processes, Process 2 and 3, have been selected for "process migration" by virtual machine management center 280 because it has determined (in accordance with any one of a number of methods that are well known to those of ordinary skill in the art) that offloading them from VM 211 will result in reducing the workload on host 210 by 50%.

FIG. 2B schematically illustrates the process of replicating or cloning VM 211 in another host, i.e., host 220. VM 211, which is being replicated, is referred to herein as the source VM. VM 221 is the replicated VM. The replication or cloning of VMs is known as VM migration and VMware VMotion technology may be used for such migration in one embodiment. VM replication or cloning by other technically feasible means known to those skilled in the art may be employed as well.

FIG. 2C schematically illustrates the process of terminating user-level processes in VM 211 and VM 221. Upon completion of VM migration, VM 221 is a clone of VM 211 such that the guest OS of VM 221 has the same processes and utilizes the same IP address and virtual MAC address as VM 211. In one embodiment, upon completion of VM migration, each of VM 211 and VM 221 utilize a "linked clone image" area of storage (storage areas 292 and 294, respectively) when writing changes to disk image 290 to avoid possible write collisions between VM 211 and VM 221 if they each wrote directly into disk image 290. In VM 211, Process 2 and Process 3 are terminated. In VM 221, all of the user-level processes other than Process 2 and Process 3 are terminated. Any known method for terminating processes may be employed during this step. In one embodiment, virtual machine management center 280 obtains process identification information from VM 211 and transmits a request to VM 221 to terminate certain ones of the identified processes. Virtual NIC 227 corresponding to VM 221 is additionally configured (e.g., in response to a request from virtual machine management center 280, in one embodiment) to utilize two different virtual MAC addresses. Specifically, when interacting with the guest OS of VM 221, virtual NIC 227 is configured to utilize prior virtual MAC address 228 that is shared with VM 211. However, when interacting with NIC 226 (and any other intermediary hypervisor components such as a virtual bridge, etc.), virtual NIC 227 is configured to utilize a new unique virtual MAC address 229 that is generated for its own use.

Figure 3:
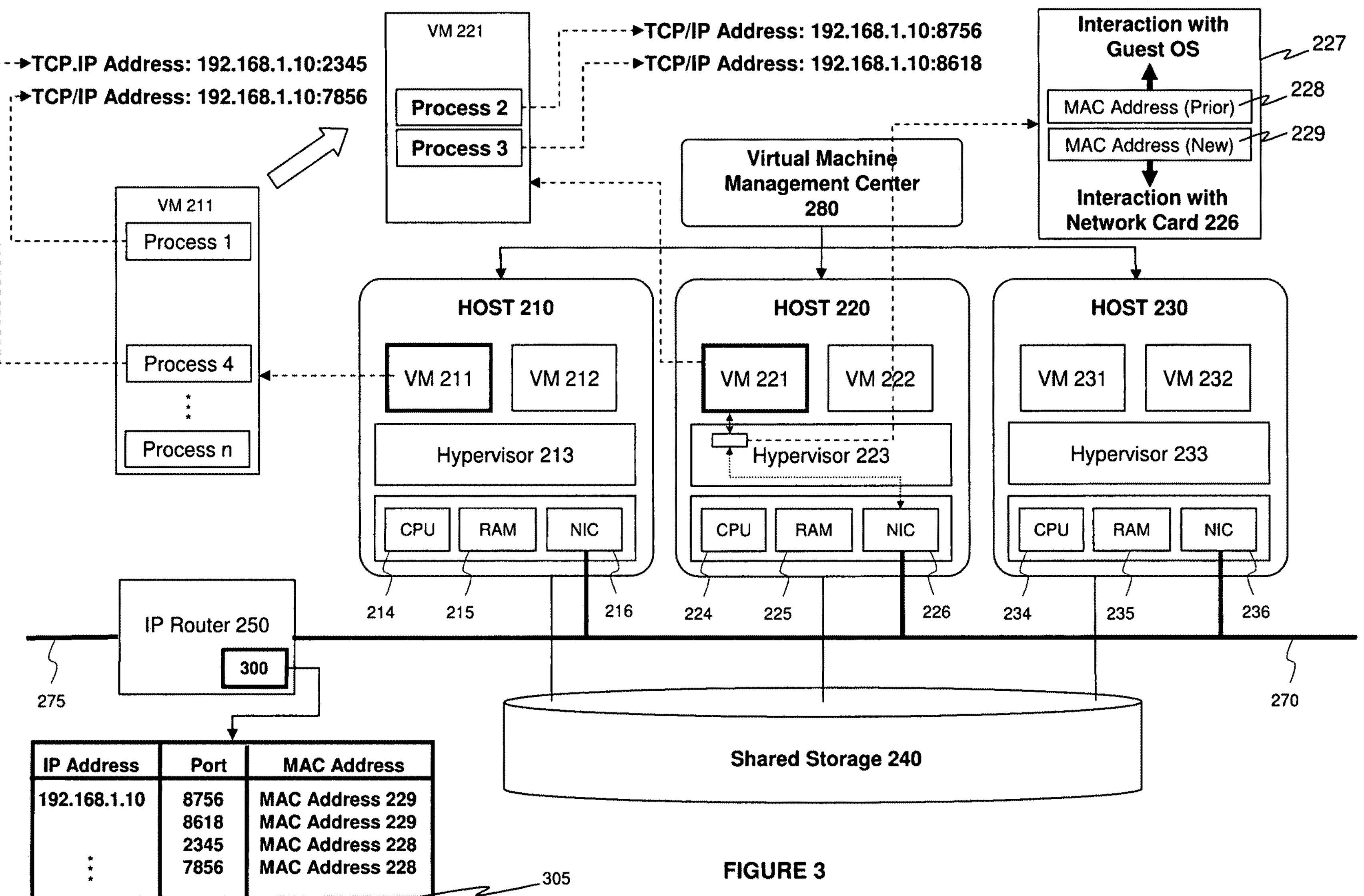
FIG. 3 depicts a virtual infrastructure according to a first embodiment of the invention.

FIG. 3 depicts a virtual infrastructure according to a first embodiment of the invention. As discussed in the foregoing, VM 211 and VM 221 share the same IP address and, for exemplary purposes, Processes 2 and 3 each utilize the same network and have established TCP connections. As shown in FIG. 3, virtual router component 300 is embedded in IP router 250, and virtual router component 300 is used to route IP packets that have as their destination IP address the IP address shared by VM 211 and VM 221. As further shown in FIG. 3, virtual router component 300 maintains routing table 305 that maps TCP/IP address-port combinations to virtual MAC addresses. In accordance with one or more embodiments of the present invention, upon completion of VM migration, virtual management center 280: (a) queries VMs 211 and 221 to obtain the TCP/IP address-port number combinations used by any established TCP/IP connections running on the VMs; and (b) instructs virtual router component 300 to insert mappings from such TCP/IP address-port combinations to virtual MAC address 228 and 229, respectively, into routing table 305.

Figure 4:
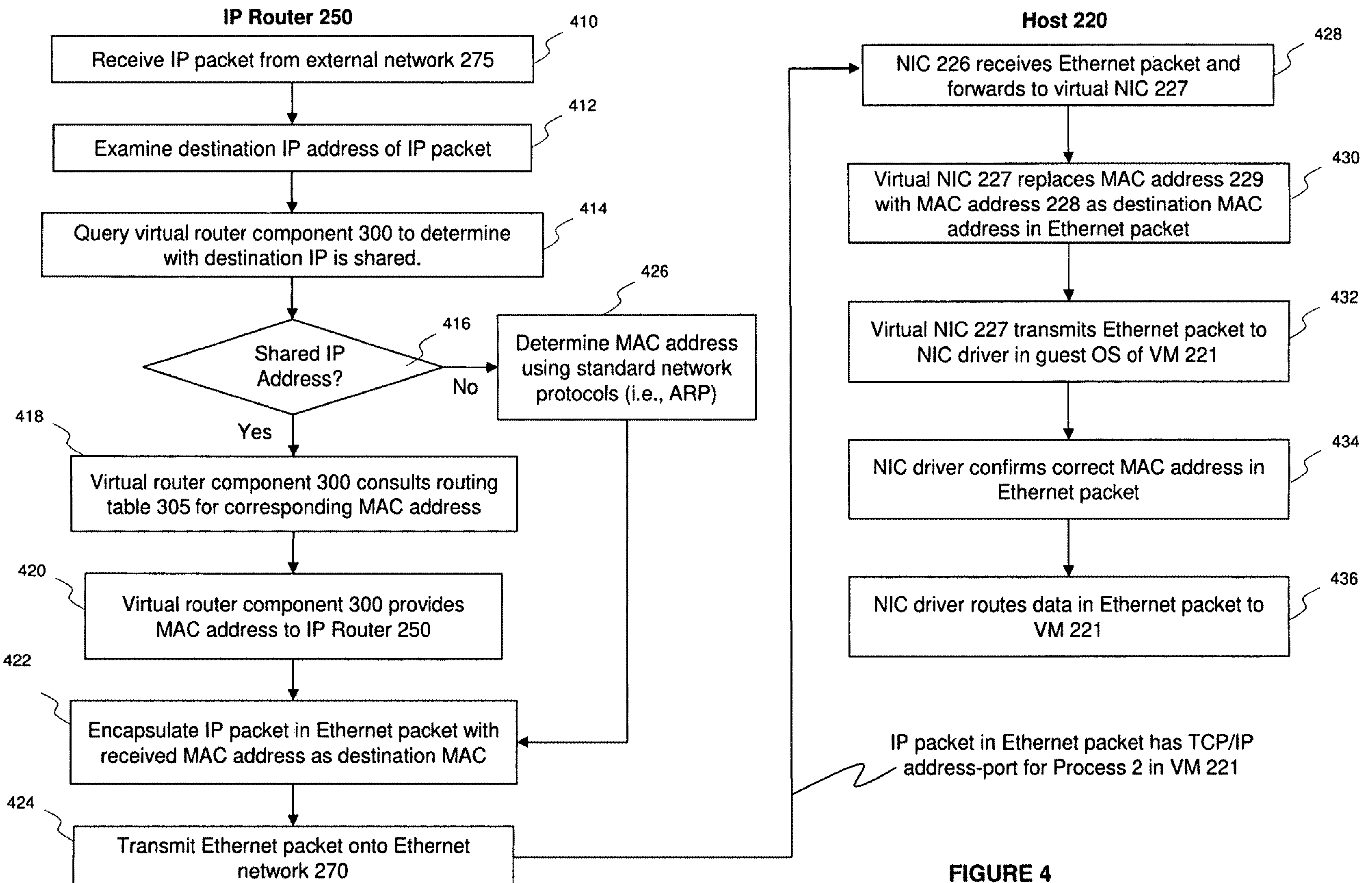
FIG. 4 is a flow diagram that illustrates how data packets are routed to a replicated virtual machine that is executing a migrated process in the embodiment of FIG. 3.

FIG. 4 is a flow diagram that illustrates how data packets are routed to a replicated VM that is executing a migrated process in the embodiment of FIG. 3. Although the method steps are described in conjunction with FIG. 3, it should be recognized that any system configured to perform the method steps, in any order, falls within the scope of the present invention.

In step 410, IP router 250 receives an IP packet from external network 270 and examines the destination IP address specified in the IP packet in step 412. Then, in step 414, IP router 250 queries its virtual router component (i.e., virtual router component 300) to determine whether the destination IP address is an IP address that is shared between a source VM and a replicated VM. Virtual router component determines that the destination IP address is an IP address that is shared between a source VM and a replicated VM if the destination IP address is stored in its routing table (i.e., routing table 305). If, in step 416, the destination IP address corresponds to such a shared IP address (i.e., destination IP address is stored in routing table 305), virtual router component 300 further examines the IP packet to extract a TCP port number and further consults its routing table (i.e., routing table 305) to determine the MAC address corresponding to the port number in step 418. In step 420, virtual router component 300 provides the MAC address to IP router 250, which in step 422, encapsulates the received IP packet in an Ethernet packet in which the destination MAC address is the MAC address received from routing table 305. In step 424, IP router 250 transmits the Ethernet packet onto Ethernet network 270. If however, in step 416, the destination IP address does not correspond to a shared IP address (i.e., the destination IP address is not stored in routing table 305), IP router 250 utilizes standard known protocols (e.g., ARP, etc.) in step 426 to determine the MAC address corresponding to the destination IP address.

In an alternative embodiment, virtual router component 300 is implemented without requiring IP router 250 to modify standard network protocols. Specifically, rather than having IP router 250 query virtual router component 300, virtual router component 300 simulates a router that sits between IP router 250 and Ethernet network 270. In such an embodiment, IP router 250 forwards all data packets to virtual router component 300, which then extracts the destination IP address from the IP packet and performs steps 416 to 426 (i.e., including transmitting ARP requests onto Ethernet 270 if the destination IP address does not correspond to a shared IP address in step 426). It should further be recognized that yet other alternative embodiments may implement virtual router component 300 as a physical router similarly situated between IP router 250 and Ethernet network 270.

Returning to FIG. 4, when the Ethernet packet is transmitted onto Ethernet network 270 in step 424, each of the NICs 216, 226 and 236 will receive and forward the Ethernet packet through the virtual bridge of its corresponding NIC driver to the virtual NICs of the VMs running its corresponding host computer 210, 220 and 230 respectively. If, for example, the IP packet received in step 410 is destined for Process 2 of VM 221 (i.e., TCP/IP address is 192.168.1.10:8756 in the IP packet as indicated in FIG. 3), then in step 424, IP router 250 transmits an Ethernet packet onto Ethernet network 270 having MAC address 229 as its destination MAC address. In step 428, NIC 226 receives and forwards the Ethernet packet via the virtual bridge in the NIC driver of hypervisor 223 to virtual NIC 227 which confirms the destination MAC address and accepts the Ethernet packet. In step 430, virtual NIC 227 replaces MAC address 229 in the destination MAC address of Ethernet packet with MAC address 228, and in step 432, transmits the Ethernet packet to the NIC driver in the guest OS of VM 221. Because VM 221 is a clone of VM 211, when the NIC driver of the guest OS receives the Ethernet packet, it is able to successfully confirm that Ethernet packet contains correct address information (i.e., namely prior MAC address 228, and not new MAC address 229) in step 434 and ultimately route the data in the packet to Process 2 in step 436.

Figure 5:
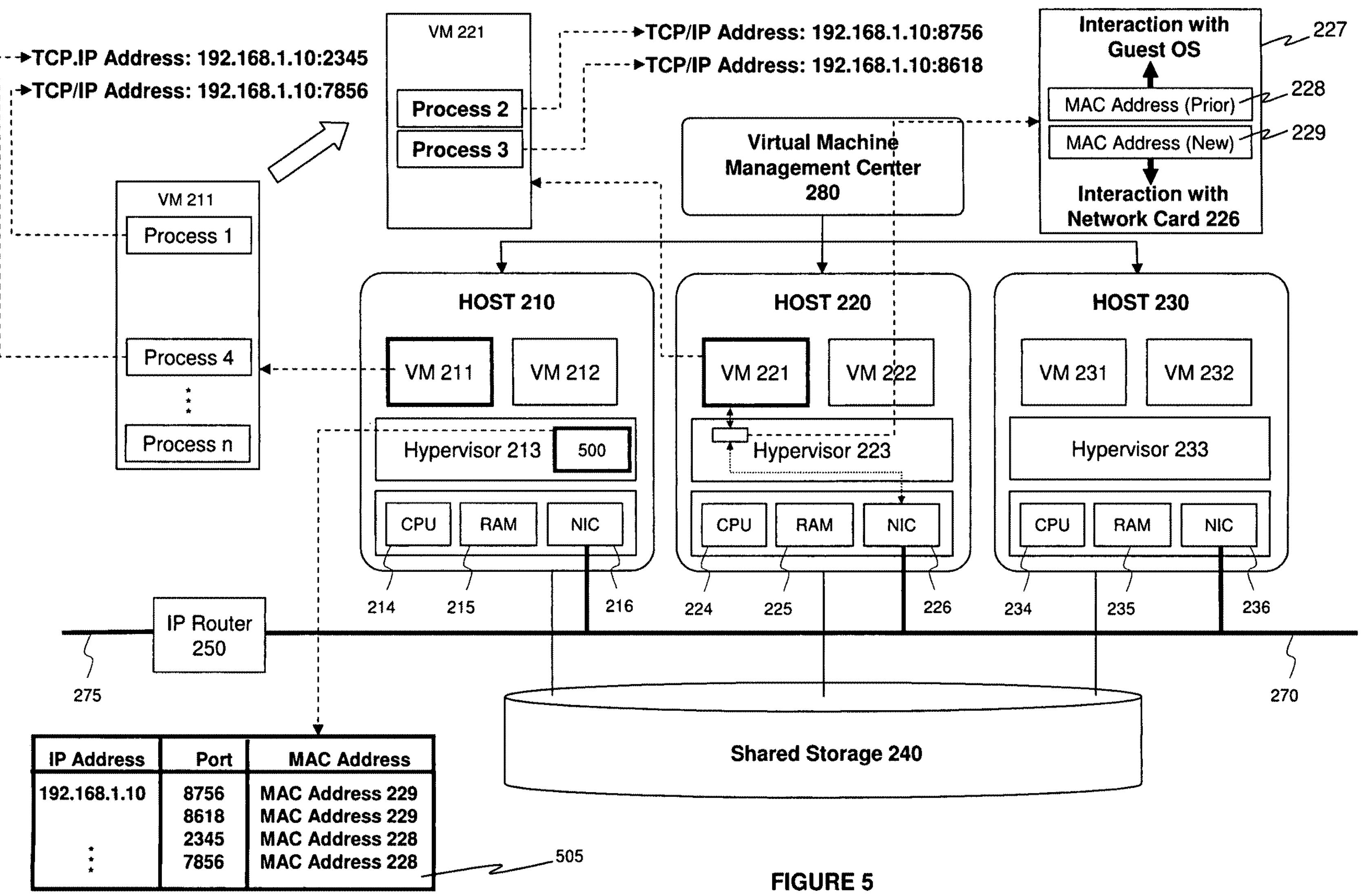
FIG. 5 depicts a virtual infrastructure according to a second embodiment of the invention.

FIG. 5 depict a virtual infrastructure according to a second embodiment of the invention. Rather than having a virtual router component as part of IP router 250 (as shown in FIG. 3), in FIG. 5, a virtual router software component 500 is embedded in the hypervisor (i.e., hypervisor 213) of host 210 running source VM 211 to properly route IP packets having as their destination IP address as the IP address shared by VM 211 and VM 221. Virtual router software component 500 is situated within the hypervisor between the virtual NIC of VM 211 and the NIC driver (including the virtual bridge) of NIC 216. Virtual router software component 500 also maintains a routing table (i.e., routing table 505) that maps TCP/IP address-port combinations to virtual MAC addresses. Upon completion of VM migration, virtual management center 280: (a) queries VMs 211 and 221 to obtain the TCP/IP address-port number combinations used by established TCP/IP connections running on the VMs; and (b) instructs virtual router software component 500 to insert mappings from such TCP/IP address-port combinations to virtual MAC address 228 and 229, respectively, into routing table 305. In one embodiment, virtual NIC 227 is further configured so as not to respond to ARP requests but rather rely on virtual router software component 500 in host 210 as a proxy to respond to ARP requests and accordingly route Ethernet packets to VM 221. It should be recognized that alternate embodiments may embed virtual router software component 500 on host 220 running replicated VM 221, and configure the virtual NIC corresponding to VM 211 to rely on the virtual router component as a proxy.

Figure 6:
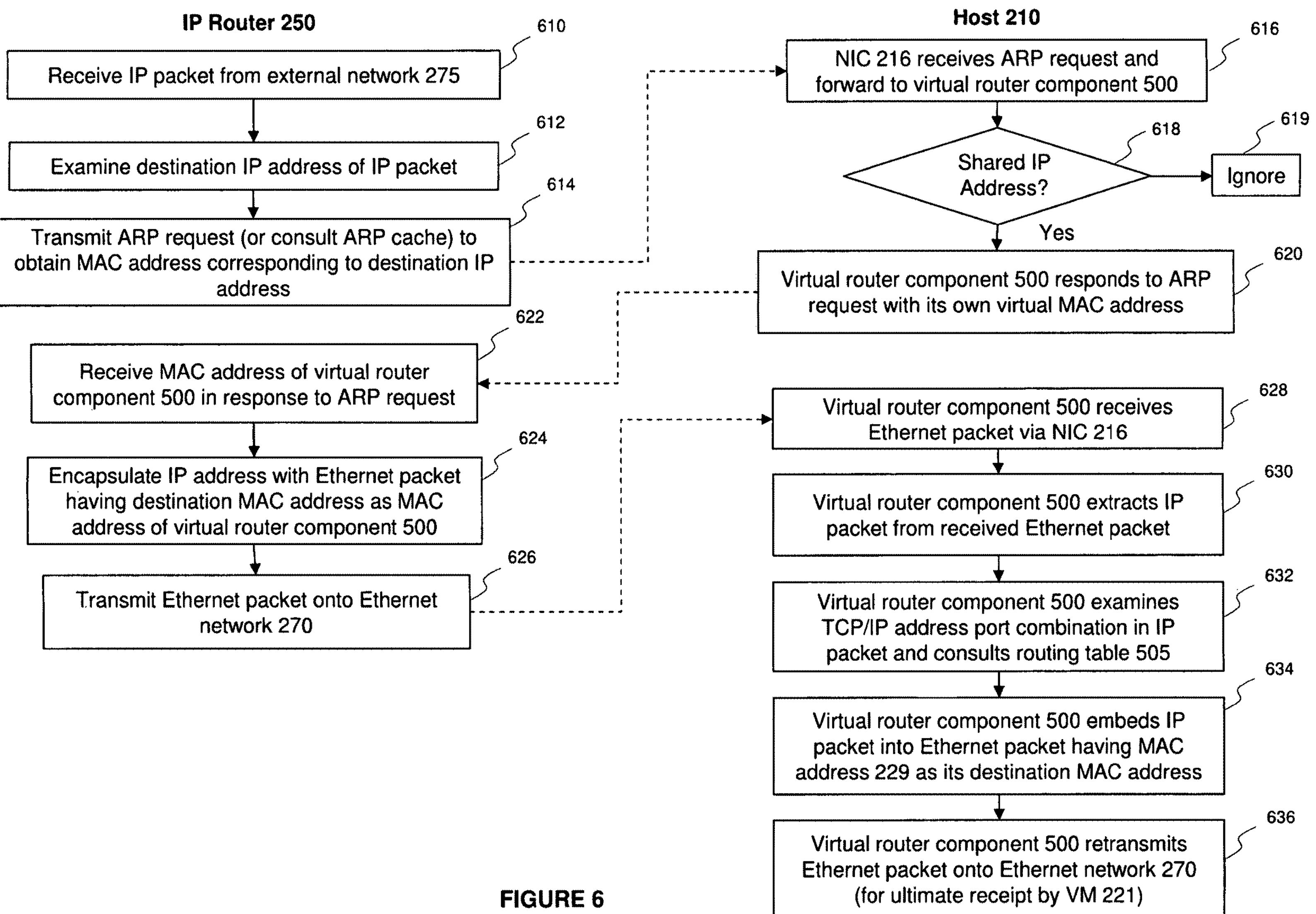
FIG. 6 is a flow diagram that illustrates how data packets are routed to a replicated virtual machine that is executing a migrated process in the embodiment of FIG. 5.

FIG. 6 is a flow diagram that illustrates how data packets are routed to a replicated VM that is executing a migrated process in the embodiment of FIG. 5. For exemplary purposes, an IP packet destined for Process 2 of VM 221 (i.e., having a destination TCP/IP address of 192.168.1.10:8756 as indicated in FIG. 3) is utilized in the following discussion. Although the method steps are described in conjunction with FIG. 5, it should be recognized that any system configured to perform the method steps, in any order, falls within the scope of the present invention.

In step 610, IP router 250 receives an IP packet from external network 275 and examines the destination IP address specified in the IP packet in step 612. In step 614, IP router transmits an ARP request onto Ethernet 270 (or consults its ARP cache) to obtain a MAC address corresponding to the destination IP address. In step 616, NIC 216 receives the ARP and forwards it through the virtual bridge of its corresponding NIC driver in hypervisor 213 to virtual router software component 500. In step 618, virtual router software component 500 determines if the destination IP address contained in the ARP request corresponds to a shared IP address by searching for the destination IP address its routing table 505. If the destination IP address is found in routing table 505, virtual router software component 500 responds to the ARP request with its own virtual MAC address in step 620. If the destination IP address is not found in routing table 505, the ARP request is ignored in step 619. In step 622, IP router 250 receives the response from virtual router software component 500, and encapsulates the received IP packet in an Ethernet packet in which the destination MAC address is the MAC address of virtual router software component 500 in step 624. In step 626, IP router 250 transmits the Ethernet packet onto Ethernet network 270. In step 628, virtual router 500 receives the Ethernet packet (i.e., via forward from NIC 216 through the virtual bridge of its corresponding NIC driver in hypervisor 213). In step 630, virtual router software component 500 extracts the IP packet from the received Ethernet packet and in step 632, examines the TCP/IP address port combination of the IP packet (in this case TCP/IP address and port is 192.168.1.10:8756 for Process 2) and consults routing table 505 for the corresponding MAC address (in this case virtual MAC address 229). In step 634, virtual router software component 500 embeds the IP packet into an Ethernet packet having MAC address 229 as its destination MAC address, and retransmits it onto Ethernet network 270 (through the virtual bridge and NIC 216) in step 636.

When the Ethernet packet is transmitted onto Ethernet network 270 in step 636, step 428 to 436 of FIG. 4 are followed such that NIC 226 receives and forwards the Ethernet packet via the virtual bridge in the hypervisor's NIC driver to virtual NIC 227 which confirms the destination MAC address, and accepts the Ethernet packet in step 428. In step 430, virtual NIC 227 replaces MAC address 229 in the destination MAC address of Ethernet packet with MAC address 228, and in step 432, transmits the Ethernet packet to the NIC driver in the guest OS of VM 221. Because VM 221 is a clone of VM 211, when the NIC driver of guest OS receives the Ethernet packet, it is able to successfully confirm that Ethernet packet contains correct address information (i.e., namely prior MAC address 228, and not new MAC address 229) in step 434, and ultimately to route the data in the packet to Process 2 in step 436.

Figure 7:
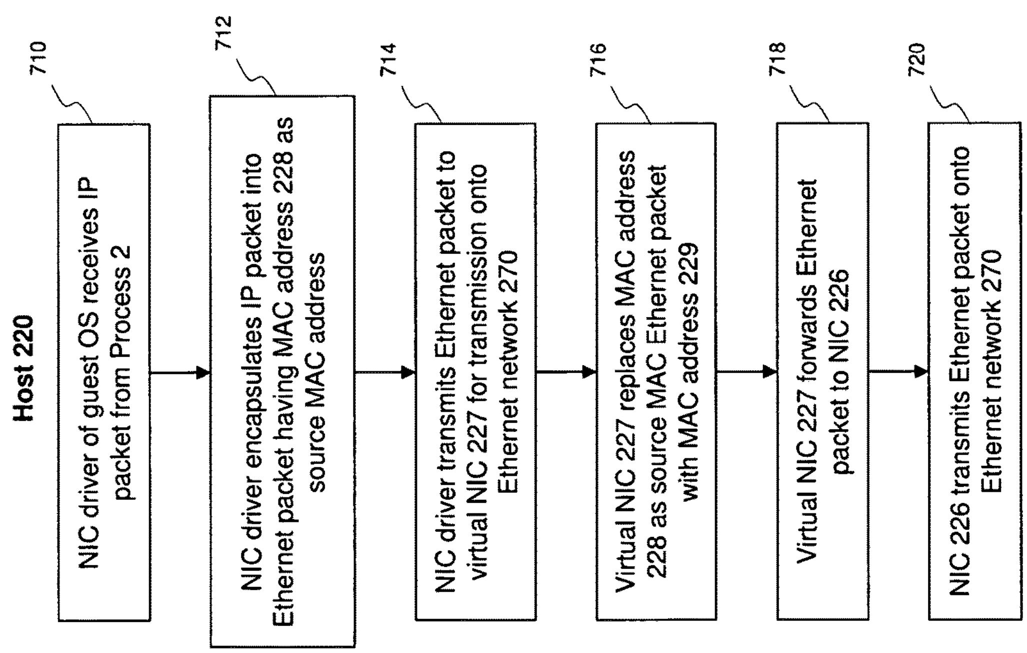
FIG. 7 is a flow diagram that illustrates how data packets are transmitted from a replicated virtual machine that is executing a migrated process, according to an embodiment of the present invention.

FIG. 7 is a flow diagram that illustrates how data packets are transmitted from a replicated VM that is executing a migrated process according to one embodiment of the present invention. Although the method steps are described in conjunction with FIG. 7, it should be recognized that any system configured to perform the method steps, in any order, falls within the scope of the present invention. In step 710, the NIC driver of the guest OS of VM 221 receives an IP packet for transmission from Process 2 running in VM 221 and encapsulates it in an Ethernet packet with the source MAC address as virtual MAC address 228 in step 712. In step 714, the NIC driver transmits the Ethernet packet to virtual NIC 227 for transmission onto Ethernet network 270. In step 716, virtual NIC 227 replaces virtual MAC address 228 with virtual MAC address 229 as the source MAC address of the received Ethernet packet and in step 718, forwards the packet through the hypervisor (including virtual bridge of the device driver of NIC 226) to NIC 226, which in step 720, transmits the Ethernet packet onto Ethernet network 270.

It should be recognized that it may be desirable in certain circumstances to "consolidate" a source VM and a replicated VM, for example, after the workload of migrated processes in the replicated VM have reduced to a point that the hardware resources of the host computer of the source VM can again accommodate all processes of the consolidated VM. In one embodiment, consolidation of a source VM and replicated VM occurs when remaining user processes of the replicated VM have terminated. Any new data or files that were generated or otherwise modified by each of the source VM and replicated VM in their respective linked clone images (e.g., 292 and 294 of FIG. 2C) are merged back into the original disk image (e.g., 290 of FIG. 2C) of the source VM so that a returning user that was accessing the replicated VM will be provided the same stored state prior to logging off when the user logs back into the virtual desktop on the source VM.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, while the foregoing embodiments have discussed per-process migration with respect to user-level processes, it should be recognized that alternative embodiments may utilize the techniques disclosed herein to migrate other types of processes, including operating system and kernel level processes. Similarly, while the foregoing embodiments have utilized a shared storage among host computers, it should be recognized that the disclosed techniques can be utilized in alternative embodiments in which host computers do not share data stores by copying virtual hard drives (or corresponding linked clone images) across data stores. Furthermore, while the foregoing embodiments have utilized a virtual bridge to forward data packets from a physical NIC to virtual NICs, it should be recognized that alternative embodiments may utilize a virtual hub, switch or router. For example, rather than having a virtual router interacting with a virtual bridge, as in the embodiments of FIGS. 5 and 6, an alternative embodiment may have the virtual router replace the virtual bridge. Similarly, the foregoing embodiments have discussed port numbers in the context of TCP/IP, however, it should be recognized that any Internet and transport layer protocol may be utilized, including, for example, UDP and other similar protocols that provide identification of application-related network end points on hosts (e.g., network sockets, etc.). Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. In a computer system having virtual machines instantiated on one or more host computers, a method for offloading one or more user-level processes running on a guest operating system that is running in a first virtual machine, said method comprising:

identifying some but not all of the user-level processes running on the guest operating system of the first virtual machine to be offloaded, each of the identified user-level processes having an associated IP and port address, wherein the user-level processes to be offloaded are identified by examining their resource usage;

replicating the first virtual machine to create a second virtual machine, the second virtual machine having a guest operating system running therein that is replicated from the guest operating system of the first virtual machine and user-level processes running on the guest operating system of the second virtual machine that are replicated from all of the user-level processes running on the guest operating system of the first virtual machine, including some that are to be offloaded and remaining user-level processes that are not to be offloaded;

terminating the user-level processes running on the guest operating system of the first virtual machine that were identified for offloading while continuing to execute all of the remaining user-level processes running on the guest operating system of the first virtual machine other than ones that were identified for offloading; and terminating all of the user-level processes running on the guest operating system of the second virtual machine that were replicated from the remaining user-level processes running on the guest operating system of the first virtual machine other than the ones that were identified for offloading while continuing to execute the user-level processes running on the guest operating system of the second virtual machine that were replicated from the user-level processes running on the guest operating system of the first virtual machine that were identified for offloading; and re-routing received IP traffic targeted to the IP and port addresses associated with identified processes on the first virtual machine to the replicated processes running on the second virtual machine that were identified for offloading from the first virtual machine.

2. The method according to claim 1, further comprising: directing data packets to the second virtual machine based on destination IP address and destination port specified in the data packets.

3. The method according to claim 2, wherein said directing data packets includes:

reading a destination IP address and a destination port specified in a data packet;

encapsulating the data packet with a MAC address associated with the second virtual machine; and transmitting the encapsulated data packet to be received by the second virtual machine.

4. The method according to claim 3, further comprising:

receiving the data packet at a host computer of the second virtual machine; and modifying the encapsulated data packet to have a different MAC address before sending the encapsulated data packet to an operating system of the second virtual machine.

5. The method according to claim 4, wherein the different MAC address is a MAC address associated with the first virtual machine.

6. The method according to claim 1, further comprising: configuring a router to associate a MAC address of the second virtual machine to IP addresses and ports of all processes running on the second virtual machine.

7. The method according to claim 6, further comprising: configuring a virtual network card of the second virtual machine to modify MAC addresses of data packets that it receives from and sends to an operating system of the second virtual machine.

8. In a computer system having virtual machines instantiated on one or more host computers, a method for offloading one or more processes running on guest operating system that is running in a first virtual machine instantiated on a first host computer, said method comprising:

identifying some but not all of the user-level processes running on the guest operating system of the first virtual machine to be offloaded, each of the identified user-level processes having an associated IP and port address, wherein the user-level processes to be offloaded are identified by examining their resource usage;

replicating the first virtual machine on a second host computer to create a second virtual machine, the second virtual machine having a guest operating system running therein that is replicated from the guest operating system of the first virtual machine and user-level processes running on the guest operating system of the second virtual machine that are replicated from all of the user-level processes running on the guest operating system of the first virtual machine, including the some that are to be offloaded and remaining user-level processes that are not to be offloaded;

terminating some but not all of the user-level processes running on the guest operating system of the first virtual machine and terminating some but not all of the user-level processes running on the guest operating system of the second virtual machine, wherein the user-level processes of the guest operating system of the first virtual machine that are terminated are the user-level processes of the guest operating system of the first virtual machine that were identified for offloading, and wherein the user-level processes of the guest operating system of the second virtual machine that are terminated were replicated from the remaining user-level processes running on the guest operating system of the first virtual machine other than ones that were identified for offloading; and re-routing received IP traffic targeted to the IP and port addresses associated with identified processes on the first virtual machine to the replicated processes running on the second virtual machine that were identified for offloading from the first virtual machine.

9. The method according to claim 8, wherein the remaining user-level processes running on the guest operating system of the first virtual machine other than the ones that were identified for offloading continue to be executed on the guest operating system of the first virtual machine.

10. The method according to claim 9, wherein the user-level processes running on the guest operating system of the second virtual machine that were replicated from the user-level processes running on the first virtual machine that were identified for offloading continue to be executed on the guest operating system of the second virtual machine.

11. The method according to claim 8, further comprising: configuring a router to associate a MAC address of the second virtual machine to IP addresses and ports of all processes running on the second virtual machine.

12. The method according to claim 11, further comprising: using the router, directing data packets to the second virtual machine based on destination IP addresses and destination ports specified in the data packets.

13. The method according to claim 12, further comprising:

reading a destination IP address and a destination port number specified in a data packet; encapsulating the data packet with a MAC address associated with the second virtual machine; and transmitting the encapsulated data packet to be received by the second virtual machine.

14. A computer system comprising:

a first host computer having a plurality of virtual machines running thereon, the virtual machines of the first host computer including a first virtual machine having a guest operating system on which a first user-level process is executed thereon, the first user-level process having an associated IP and port address;

a second host computer having a plurality of virtual machines running thereon, the virtual machines of the second host computer including a second virtual machine having a guest operating system on which a second user-level process is executed thereon, the second user-level process having an associated IP and port address; and a router configured to re-direct a data packet from the first user-level process running on the first host computer to the second user-level process running on the second host computer based on the IP and port addresses of the first and second user-level processes specified in the data packet, the second user-level process having been replicated from the first user-level process, wherein the second user-level process is a user-level process that has been identified for offloading from the first virtual machine by examining its resource usage, wherein the first virtual machine and the second virtual machine share the same IP address and have different MAC addresses, and wherein the router is configured to redirect the data packet to the second user-level process by using a routing table containing the MAC address of the first virtual machine and the MAC address of the second virtual machine.

15. The computer system according to claim 14, wherein guest operating systems of the first virtual machine has a first IP and MAC addresses and the guest operating system of the second virtual machine has a second IP and MAC addresses, the second IP and MAC addresses being respectively identical with the first IP and MAC addresses.

16. The computer system according to claim 15, wherein the second virtual machine employs a virtual network card that is configured to convert MAC addresses contained in data packets received from the router.

17. The computer system according to claim 15, wherein the second virtual machine employs a virtual network card that is configured to convert MAC addresses contained in data packets received from the guest operating system of the second virtual machine.

18. The computer system according to claim 14, wherein the router is a virtual router that is running on the first host computer.

19. The method according to claim 1, wherein the one or more user-level processes to be offloaded comprise processes that send and receive packets over a network.

20. The method according to claim 8, wherein the one or more user-level processes to be offloaded comprise processes that send and receive packets over a network.

21. The computer system according to claim 14, wherein the router includes a routing table having multiple entries, a first one of the entries including a destination IP address of the first virtual machine, the first destination port, and the MAC address of the first virtual machine, and a second one of the entries including a destination IP address of the second virtual machine, the second destination port, and the MAC address of the second virtual machine, and wherein the destination IP addresses of the first and second virtual machines are the same.

* * * * *